No. 697,252.  
E. HUDSON.  
VEHICLE WHEEL.  
(Application filed Jan. 13, 1902.)  
Patented Apr. 8, 1902.

(No Model.)

Witnesses  
J. D. McCormick  
M. J. Daley

Inventor  
Edmund Hudson,  
By his Attorney  
Chas. F. Schmelz

THE NORRIS PETERS CO., PHOTO-LITHO., WASHINGTON, D. C.

UNITED STATES PATENT OFFICE.

EDMUND HUDSON, OF TEMPLETON, MASSACHUSETTS.

VEHICLE-WHEEL.

SPECIFICATION forming part of Letters Patent No. 697,252, dated April 8, 1902.

Application filed January 13, 1902. Serial No. 89,398. (No model.)

*To all whom it may concern:*

Be it known that I, EDMUND HUDSON, a citizen of the United States, and a resident of Templeton, in the county of Worcester and State of Massachusetts, have invented certain new and useful Improvements in Vehicle-Wheels, of which the following is a full, clear, and exact specification.

My invention relates to vehicle-wheels, and more especially to that class thereof which are utilized for propelling vehicles on streets and country roads; and it has for one of its objects the provision of a wheel which will possess a great amount of traction and may be made comparatively cheap and simple in construction.

My invention has, furthermore, for its object the provision of a wheel the tread portion of which is made of fibrous material and yet proof against dry rot and decay caused by atmospheric conditions.

My invention has, furthermore, for its object the provision of a wooden tire capable of being easily removed to permit the substitution of another tire for the one in use.

Further objects of my invention may be found in the combination, with such a wheel-tire, of reinforcing members for confining the sides thereof to prevent disintegration of the fibers and in the provision of means for positioning and retaining said tire radially and laterally of the wheel-rim, as will be hereinafter described, and particularly pointed out in the claims.

It is well known that driving-wheels of vehicles and more especially those of motor-vehicles should have a great amount of traction on account of the various conditions of roads over which the vehicle has to travel, these conditions referring not only to up or down grades, but also to different kinds of soil and to the changes in the soil inherent to weather conditions. Many of these requirements are met by rubber tires, which, on the other hand, are heavy, subject to puncture when of the pneumatic variety, and very costly.

It is the particular aim of my invention to produce a tire the life of which will not only equal that of the rubber tire, but which will be light in weight, inexpensive, and easily replaced when required and which, furthermore, will not necessitate the employment of any special shape of wheel-rim, so that any ordinary wheel may be fitted without trouble, the width of the rim of tread governing the size of the tire required.

My invention has been fully illustrated in the accompanying drawings, in which similar characters denote similar parts, and in which—

Figure 1:
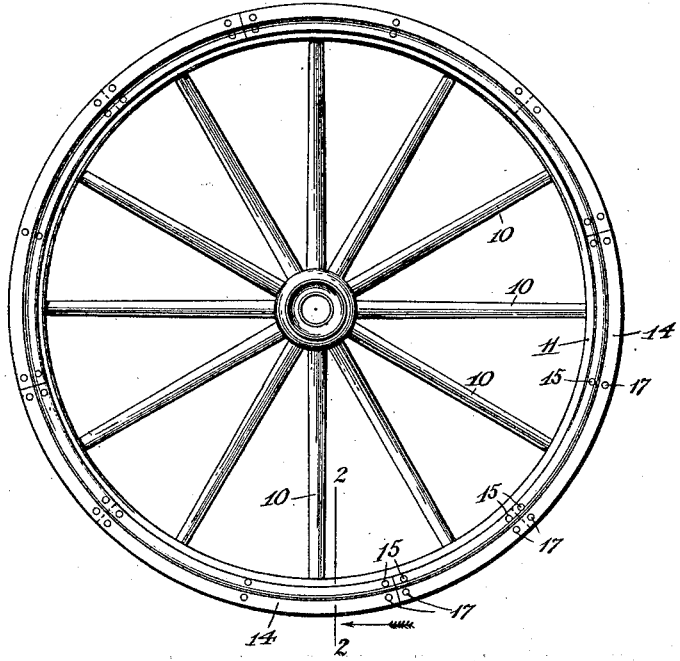
Figure 2:
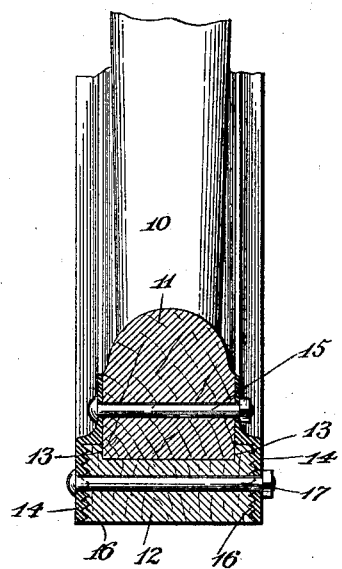

Figure 1 represents a side view of a wheel made in accordance with my improvements, and Fig. 2 is a section on line 2 2 of Fig. 1.

It should be stated at the outset that it is immaterial what the particular cross-sectional form of my improved tire may be, and it should also be understood that when desired the rim of the wheel itself may incorporate my improvements without the assistance of an independent tire.

In the drawings, 10 10 denote the spokes of the wheel, secured with their outer ends in a rim 11 in any suitable manner, the rim shown being that of an ordinary carriage-wheel to which a tire of my improved construction is applied.

As above stated, my invention has for one of its objects the provision of a tire possessing a great amount of traction, and I accomplish this result by employing a tire made of fibrous material, preferably wood, the grain of which is disposed substantially at right angles with the peripheral line of the tire, so that the tread will at all times present a comparatively rough but even surface for contact with the road. The tire, which is herein indicated by 12, comprises a plurality of adjacent sections the lengths of which peripherally depend, of course, upon the size of the wheel, said sections being shorter as the diameter of the wheel decreases.

In order to position and hold the tire on the wheel-rim laterally thereof, any suitable means may be used, the construction shown in the drawings comprising a pair of interlocking faces 13 coöperative with the sides of the wheel-rim and forming substantially an annular groove into which the rim may be placed.

Inasmuch as the grain of the tire is practically radial and as consequently there is a great liability of the tire breaking out at the sides, means are provided for reinforcing the sides thereof, these means consisting, in the present instance, of two members 14, the outside diameter of which is substantially equal to that of the tire, and which is disposed at opposite sides of the tire, and preferably also made in peripheral sections for convenience in manufacture and handling. These sections 14 are preferably metallic and adjacent each other on the same side of the wheel, while their joints overlap those on the opposite side of the wheel-rim, both of said sets of sections being secured to the rim—as, for instance, by a plurality of clamping devices or bolts 15 passing through the sections and the rim, as clearly shown in Fig. 2.

In addition to the interlocking faces 13, whereby the tire is held on the rim laterally, means are provided for retaining the tire-sections in close contact with the outer periphery of the wheel-rim, and in this instance the members 14 are provided at their inner faces with projections 16, adapted to be forced into the sides of the tire (see Fig. 2) and held in engagement therewith by a bolt or rivet 17 passing through both members 14 and the tire 12, thus rendering the tire substantially unitary with the rim. In their preferred form the projections 16 are formed continuous and concentric, so that the tire will be gripped substantially for the entire extent of its side faces, thus producing the best results.

The manner of applying a tire made in accordance with my invention is extremely simple and is as follows: The tire-sections being fitted according to the size of the wheel are clamped in place on the rim temporarily, whereupon the retaining members 14 are placed at the opposite sides of the wheel, forced into the tire and into contact with the sides of the rim. Holes may now be drilled through the retaining members and the rim, thus positioning and holding both of these members firmly together by inserting bolts or rivets 15 and tightening the same in place. The reinforcing members 14 and the tire 12 may now be drawn tightly together by bolts 17 passing through suitable apertures drilled through said retaining members and the tire, when the wheel is ready for work. When it is desired to remove the tire, the clamping-bolt 17 should be withdrawn and the clamping member 15 loosened sufficiently to permit the removal of the tire 12 from the rim, after which the tire-sections 12 may be placed in position on the rim and drilled in accordance with the apertures for the bolts 17, which may then be reinserted and tightened, when the wheel will be again ready for work.

Having described my invention, what I claim as new, and desire to secure by Letters Patent, is—

1. The combination, with a vehicle-wheel; of a wooden tire formed of sections, the grain of which is disposed substantially at right angles with the peripheral line of said tire, each of said sections having an annular groove for receiving the wheel-rim; and a pair of annular members disposed at opposite sides of and engaging the tire and the wheel-rim, and the outside diameter of which is substantially equal to that of the tire.

2. The combination, with a vehicle-wheel; of a wooden tire formed of sections the grain of which is disposed substantially at right angles with the peripheral line of said tire, each of said sections having an annular groove for receiving the wheel-rim; and a pair of metallic members disposed at opposite sides of and for reinforcing said tire laterally, said members having annular projections on their inner faces; and means for forcing said members together and thus drive the projections into the tire laterally of the grain thereof.

3. The combination, with a vehicle-wheel; of a wooden tire formed in sections, the grain of which is disposed substantially at right angles with the peripheral line of said tire, each of said sections having an annular groove for receiving the wheel-rim; and a pair of sectional metallic members disposed and overlapping each other, at opposite sides of, and for reinforcing, said tire, laterally, said members having annular projections on their inner faces; and means for forcing said members together and thus drive the projections into the tire laterally of the grain thereof.

EDMUND HUDSON.

Witnesses:
CHAS. F. SCHMELZ,
JULIA G. McCORMICK.